United States Patent [19]

Yxfeldt

[11] 4,192,463
[45] Mar. 11, 1980

[54] CONNECTING DEVICE

[76] Inventor: Leif J. Yxfeldt, Fregattvägen 14, S-181 37 Lidingö, Sweden

[21] Appl. No.: 893,830

[22] Filed: Apr. 6, 1978

[30] Foreign Application Priority Data

Apr. 13, 1977 [SE] Sweden .................. 7704242

[51] Int. Cl.² ............................................. B05B 15/08
[52] U.S. Cl. ................................. 239/289; 239/282; 239/397; 239/588
[58] Field of Search ............ 239/588, 586, 530, 447, 239/446, 397, 283, 284, 289; 251/149.1, 149.6, 149.3; 4/145

[56] References Cited

U.S. PATENT DOCUMENTS

| 833,143 | 10/1906 | Wolf | 251/149.6 |
|---|---|---|---|
| 3,971,074 | 7/1976 | Yxfeldt | 4/145 |

FOREIGN PATENT DOCUMENTS

| 1060689 | 4/1954 | France | 4/145 |
|---|---|---|---|
| 2278404 | 2/1976 | France | 239/446 |

*Primary Examiner*—John J. Love
*Attorney, Agent, or Firm*—Oblon, Fisher, Spivak, McClelland & Maier

[57] ABSTRACT

A connecting device for connecting a water hose to an object. It includes at least two pieces, of which one is connected to the water hose and the second to the object. The first connecting piece consists of a hand shower, part of which is a handle and part a shower head. The hand shower contains a valve device having a valve body which is moveable between at least two positions, and which is designed to be moved to a connected position by means of the second connecting piece. The valve is designed to then allow water to flow from the hand shower to the object while preventing water flow out of the shower head; but the valve allows water to flow from the shower head when the valve body is in its normal non-connected position.

8 Claims, 6 Drawing Figures

CONNECTING DEVICE

BACKGROUND OF THE INVENTION

1. Field of the Invention

The present invention concerns a coupling device for connecting a water hose to an object and comprised of two connecting parts, of which one is connected to the water hose and the other to the object.

2. Description of the Prior Art

A shower device is already known through Swedish Pat. No. 7314675-5 which contains a connecting device which is adjustable in the vertical direction by means of a holding device which is fastened to a wall and which is adjustable to any height on the holding device. The connecting device according to that patent is provided with a connector for connection to a source of water and to a shower arm which is provided with a shower head. The disadvantage of this construction is that the connecting device is complicated, heavy, and consequently expensive. Since one normally wishes to have the possibility of connecting a hand-shower to the connecting device, this becomes even more complicated and must be provided with a switchover valve for selective connection between hand-shower and stand-up shower.

SUMMARY OF THE INVENTION

The object of the present patent is thus to eliminate the disadvantages of the above-mentioned Swedish patent and at the same time to make possible a construction with manifold various applications.

Besides connection to a stand-up shower one can, for example, use the connecting device of the invention to connect a washing machine or some other type of water-user to a source of water.

This objective is realized through a connecting device which in the main is characterized by the first part of the connector being made as a hand-shower with one part formed as a hand-grip and another part provided with a shower head, whereby the hand-shower is comprised of a valve device with a valve body which is moveable between at least two positions and which is designed so that upon connection it is operated by the other part of the connector into a position such as to permit the transfer of water from the hand-shower to the object and simultaneously to prevent water from flowing out of the shower head, and that the valve device is designed to permit water flow out of the shower head when the valve body is in its normal position, not operated by the other connector.

According to one form of the invention the valve device contains a valve opening into which the other connecting part is insertable in order to displace the valve body from its normal position to its connected position, and in which the valve body is made so that in its normal position a pressure chamber in the hand-shower is connected with the shower head, while in its coupled position the pressure chamber is connected with the other connecting part inserted into the valve opening.

BRIEF DESCRIPTION OF THE DRAWINGS

Various other objects and many of the attendant advantages of the present invention will be readily appreciated as the same becomes better understood by reference to the following detailed description when considered in connection with the accompanying drawings, in which like reference characters designate the same or similar parts throughout the figures thereof and wherein.

DETAILED DESCRIPTION OF THE PREFERRED EMBODIMENTS

Figure 1:
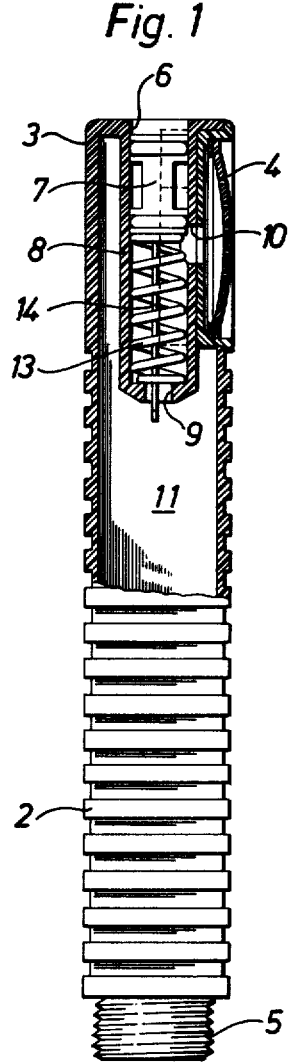
FIG. 1 shows a partially sectioned side view of the hand-shower according to the invention.
Figure 2:
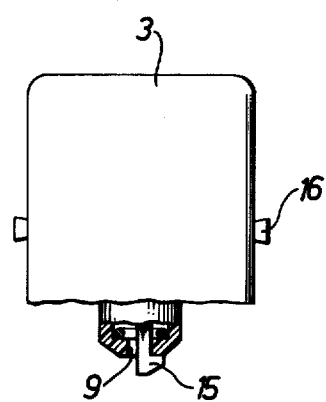
FIG. 2 shows the front part of the hand-shower of FIG. 1 seen from the back.
Figure 3:
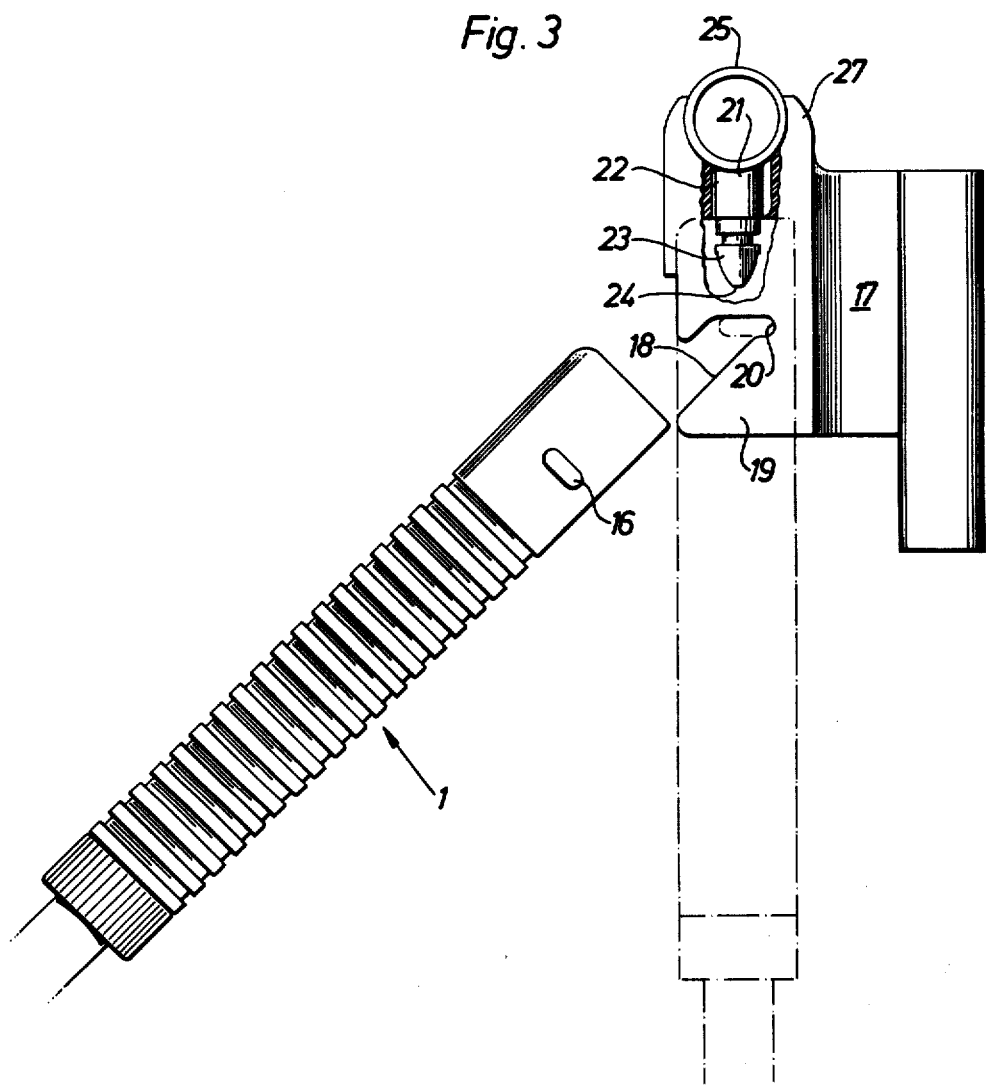
FIG. 3 shows the hand-shower of FIG. 1 in position to be placed in a holder which forms a part of the other connecting piece. The hand-shower is shown in the inserted position in dashed lines.
Figure 4:
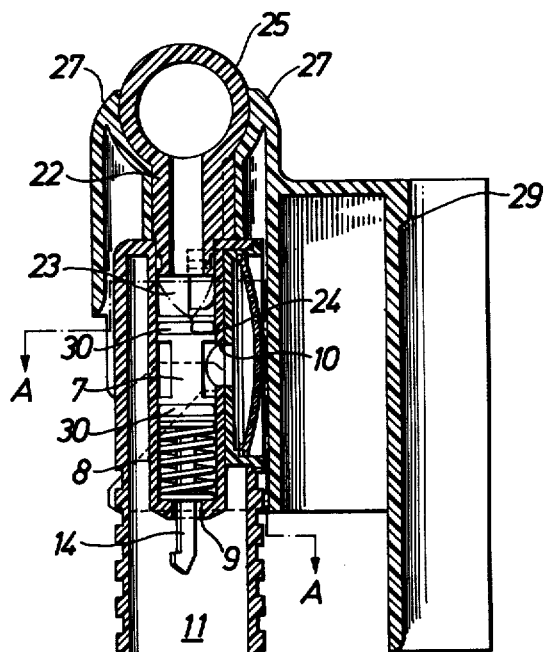
FIG. 4 shows a partially sectioned side view of the hand-shower in the inserted position in the holder.
Figure 5:
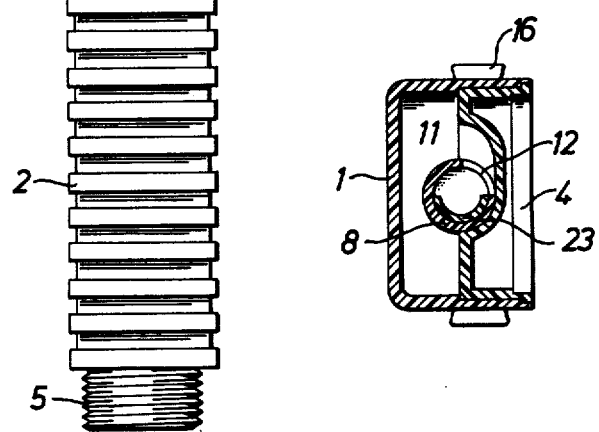
FIG. 5 shows a cross-section along the lines A—A in FIG. 4.
Figure 6:
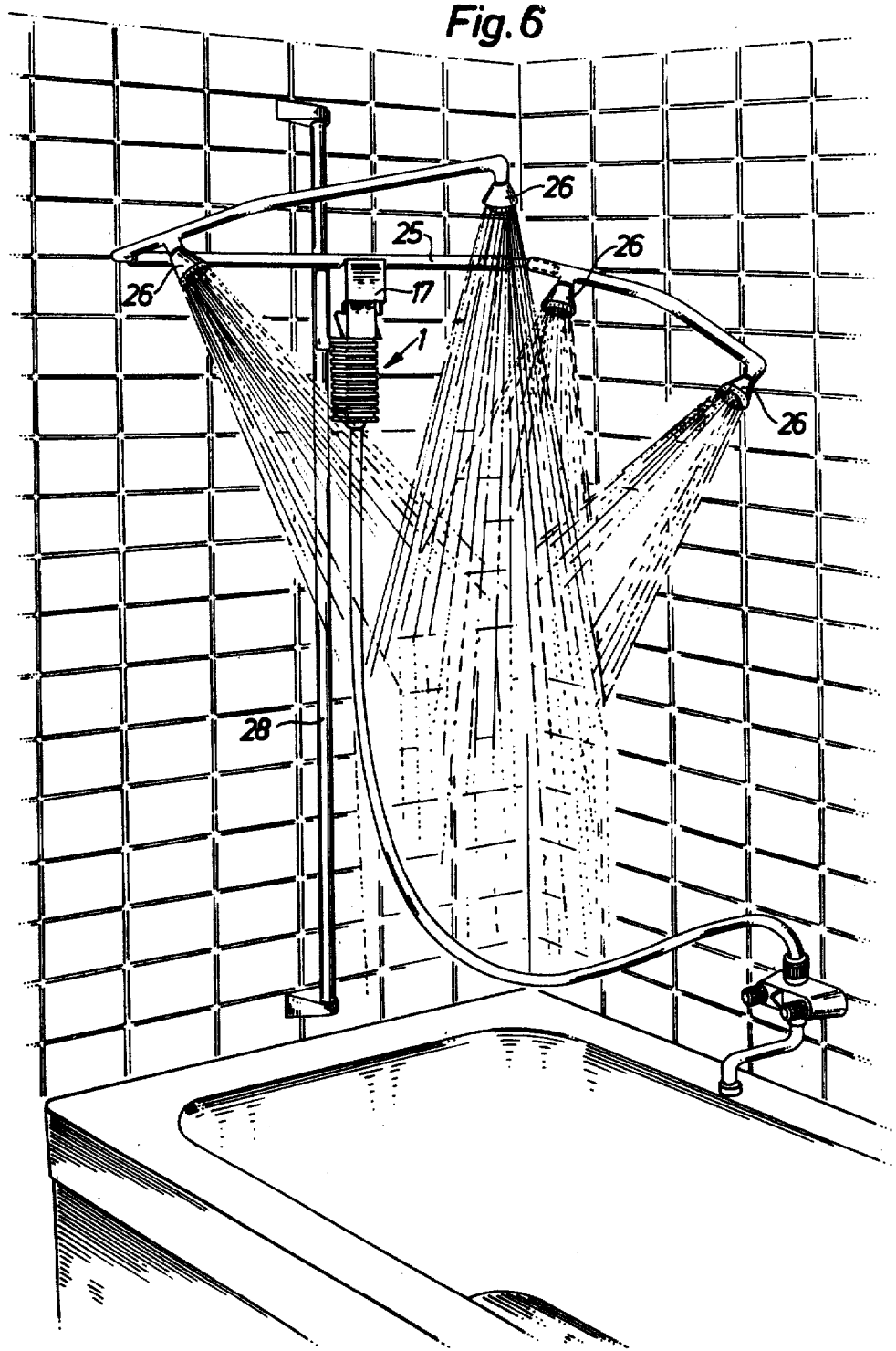
FIG. 6 shows the application of the connecting device according to the invention in the context of a known shower device.

In FIG. 1 is seen a hand-shower 1 according to the invention, provided with a rear part 2, formed into a hand grip, and a front part 3 containing a shower head 4. The rear part is further provided with a connection for a shower hose 5. The handshower according to the invention is further provided with a valve opening 6, which is closeable by means of a valve body 7. In FIG. 1 the valve body is shown in its forward position in which it connects a pressure chamber 11 inside the hand-shower with the shower head 4, while in its rearward position as shown in FIG. 4 it connects the pressure chamber 11 with valve opening 6 and simultaneously blocks the connection between the chamber 11 and the shower head 4. The valve body 7 is moveable in a channel 8 and has a front orifice which corresponds to the valve opening 6 and a rear orifice 9 and two side openings 10 and 12 (see FIG. 5), so constructed that when the valve body 7 is in the forward position the pressure chamber 11 is in communication with the rear side opening 10 via the rear orifice 9, and thus in communication with the shower head 4. When the valve body 7 is in the rear position, as shown in FIG. 4, the pressure chamber 11 is in communication with the front orifice 6 via the front side opening 12. Thus, when the valve body is in the front position water can flow unhindered from the pressure chamber out to the shower head via the rear orifice 9 and the rear side opening 10. When, on the other hand, the valve body 7 is in the rear position the rear side opening 10 is blocked at the same time as the front side opening 12 is opened so that the water can flow unhindered from the pressure chamber 11 on the outside of channel 8 through the front side opening 12 and out through the front orifice 6. In the construction shown in the figures valve 6 is made with its axis essentially perpendicular to the shower head opening 4 and parallel to the hand grip part 2. The valve body is urged by a spring 13 in a direction toward the forward position and a spindle 14 fixed in the valve body is provided with a hook 15 which engages the outside of the rear orifice 9 in order to keep the valve body 7 from being forced out of the channel 8 by the spring 13. In FIG. 2 it is seen that the forward part 3 of the hand shower is made with studs which extend out to the sides. The function of these studs is shown in FIG. 3. They are provided to work in connection with guide surfaces 18 formed in the holder as the hand shower is inserted in the holder. When the upper part of the hand-shower is inserted into the holder, the two studs slide up against these guide surfaces 18, which form a part of the inner surface of slots formed in the sdie walls 19 of the holder. The pressure which one exerts on the hand-shower inward toward the holder is thus given a component along the length of the holder whereby the hand-shower and therewith the valve device are moved up against the connecting part 21 which is carried by the holder 17. The connecting part 21 thus operates the valve body 7 as the hand-shower is inserted into the holder so that it is displaced from the forward position as shown in FIG. 1 to the rear position as shown in FIG. 4. In this position the valve body 7 seals off opening 10 and thereby prevents water from flowing out of the shower head 4. At the same time the rear side opening 12 is opened so that the pressure chamber 11 is connected with the interior of the channel 8. The valve body 7 seals against the inside of the channel with the help of two O-rings 30 placed on opposite sides of the center of the valve body. Connecting piece 21 consists of a tubular piece 22, the end portion of which is formed in a scoop shape which conforms to the inner shape of the channel 8 and which has a front contact surface 24 which is designed to operate the valve body 7. By means of this construction the water which flows into channel 8 continues through the tubular part 22 and to the tube 25 which carries the shower arms with shower heads 26 as shown in FIG. 6. In the construction shown in the figure the tubular part 22 forms a part of the tube 25 and holder 17 is made with a fixture in the form of two clamping members 27 between which the tube 25 can be pressed down, whereby the members 27—since the material has a certain elasticity—spring outwards and in springing back around the tubular part 25 hold it with sufficient force that the hand-shower can be inserted into the notch 20 without risk that the tubular part 25 will be pressed out from between the two clamping members during the insertion.

One can of course imagine an alternative construction form in which the tubular part is fastened in a conventional way into a connecting device which is made with another coupler of a type which can operate the valve body 7.

According to the construction of the invention shown in FIG. 6 the holder 17 is adjustable on a rod 28 which is fastened to the wall and this is also provided with a friction device 29 (see FIG. 4) which is designed to work in connection with rod 28 and make possible a selective height adjustment of the shower heads 26. According to FIG. 6 the hand-shower is attached to a source of water in the usual way by means of a hose 29 connected to a source of water and one can easily see the advantages the invention offers of great flexibility and simple construction of the connecting device as well as quick change-over between hand-shower and stand-up shower without the hindrance of a hose between the water source and the stand-up shower while one is using the hand-shower.

Meanwhile the connecting device according to the invention is not limited to connections between hand-showers and stand-up showers as shown in FIG. 6, but one can even imagine that the second connecting device is attached, for example, to or near a washing machine located in the bathroom and which one could thus easily connect to the water source with the help of the first connecting device, that is, the hand-shower. There are, of course, even other conceivable possibilities of using the hand-shower as a connecting element, such as with brushes and bath sponges. One could even simply connect, for example, a water-massage brush to the hand-shower valve mechanism whereupon the hand-shower would become the brush handle.

Obviously, many modifications and variations of the present invention are possible in light of the above teachings. It is therefore to be understood that within the scope of the appended claims the invention may be practiced otherwise than as specifically described herein.

What is claimed as new and desired to be secured by Letters Patent of the United States is:

1. Connecting device for connecting a water hose to an object and including at least two connecting pieces, of which one is connected to the water hose and the second to the object, characterized by the first connecting piece consisting of a hand-shower (1), in which a part (2) is formed as a handle and an other part (3) is equipped with a shower head (4), and in which the hand-shower contains a valve device (6,7,8,9) with a valve body (7) which is moveable between at least two positions and which is designed to be moved to a connected position by means of the second connecting piece (17, 21), in which the valve device is designed to allow water flow from the hand-shower (1) to the object (26) and at the same time prevent water flow out of the shower head, but in which the valve device is designed to allow water flow from the shower head when the valve body (7) is in its normal position, not influenced by the second connecting piece.

2. Device according to claim 1, characterized by the valve device containing a valve opening (6), in which a part of the second connecting piece (17, 21) is insertable for the displacement of the valve body (7) from its normal position to its connected position, and that the valve body is made so that in its normal position it connects a pressure chamber (11) incorporated into the hand-shower with the shower-head (4), while in its connected position it is constructed so that the pressure chamber (11) is set into communication with the second connecting piece (17, 21).

3. Device according to claim 1, characterized by the second connecting piece including a holder (17) in which the hand-shower is insertable, as well as a means (23) designed to displace the valve body (7) from its normal position to the connected position when the hand-shower is inserted into the holder, whereby the holder includes means (18, 19, 20) intended to cooperate with corresponding means (16) on the hand-shower to make it possible to fix the latter in a certain position in the holder.

4. Device according to claim 1, wherein said hand shower includes a front part and characterized by said front part (3) of the hand-shower being formed with studs extending to the sides (16), designed to slide upon guide surfaces (18) in the holder during the insertion of the hand-shower into the holder, and thereafter to engage in slots (20) in the side walls (19) of the holder in order to make it possible to turn the hand-shower about the studs (16), a part of the second connecting piece (21) being pressed against the valve body (7) which is thereupon displaced from its normal position to the connected position.

5. Device according to claim 1 characterized by the valve device including a channel (8) in which the valve body (7) is moveably disposed and that the channel includes a front orifice (6) which corresponds with the valve opening and a rear orifice (9) and a front side opening (12) and a rear side opening (10) so disposed that when the valve body is in the normal position the pressure chamber (11) communicates with the rear side opening while in the connected position, the pressure chamber (11) communicates with the front orifice (6) via the front side opening (12).

6. Device according to claim 2, characterized by the second connecting piece (21) containing a tubular part (22), the end (24) portion of which is formed with a contact surface designed to operate the valve body (7) of the hand-shower and with an opening through which water can flow into the tubular part when said tubular part is inserted into the valve opening (6).

7. Device according to claim 2, characterized by the second connecting piece (21) being connected to a shower device fastened to a wall.

8. Device according to claim 2, characterized by the second connecting piece (21) being connected with a water user.